United States Patent
Kang

(10) Patent No.: US 8,456,289 B2
(45) Date of Patent: Jun. 4, 2013

(54) APPARATUS AND METHOD FOR PROVIDING HAPTIC FUNCTION IN A PORTABLE TERMINAL

(75) Inventor: Sung-Mim Kang, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 675 days.

(21) Appl. No.: 12/648,379

(22) Filed: Dec. 29, 2009

(65) Prior Publication Data
US 2010/0164697 A1   Jul. 1, 2010

(30) Foreign Application Priority Data
Dec. 30, 2008   (KR) .................. 10-2008-0136308

(51) Int. Cl.
*H04B 3/36*   (2006.01)
*H04M 1/00*   (2006.01)

(52) U.S. Cl.
USPC .................. 340/407.1; 340/407.2; 340/505; 455/556.1

(58) Field of Classification Search
USPC ............. 340/407.1, 502, 505, 539.1, 539.11, 340/407.2; 345/156, 173, 186; 455/556.1, 455/566
See application file for complete search history.

(56) References Cited

U.S. PATENT DOCUMENTS

| | | |
|---|---|---|
| 2006/0061545 A1* | 3/2006 | Hughes et al. ................ 345/156 |
| 2007/0091063 A1* | 4/2007 | Nakamura et al. ............ 345/156 |
| 2007/0213110 A1* | 9/2007 | Rosenberg ........................ 463/7 |
| 2009/0088204 A1* | 4/2009 | Culbert et al. ............. 455/556.1 |
| 2009/0167542 A1* | 7/2009 | Culbert et al. ................ 340/635 |
| 2009/0280860 A1* | 11/2009 | Dahlke ...................... 455/556.1 |
| 2009/0303204 A1* | 12/2009 | Nasiri et al. .................. 345/184 |
| 2010/0214243 A1* | 8/2010 | Birnbaum et al. ............ 345/173 |
| 2011/0050404 A1* | 3/2011 | Nakamura et al. ......... 340/407.1 |

* cited by examiner

*Primary Examiner* — Van T. Trieu
(74) *Attorney, Agent, or Firm* — Cha & Reiter, LLC

(57) ABSTRACT

An apparatus and a method for providing a haptic function in a portable terminal are provided. The method for providing the haptic function in the portable terminal includes determining information which denotes a movement of the portable terminal, generating a haptic data to stimulate a user's tactile sense according to the information and generating a vibration corresponding to the haptic data.

18 Claims, 5 Drawing Sheets

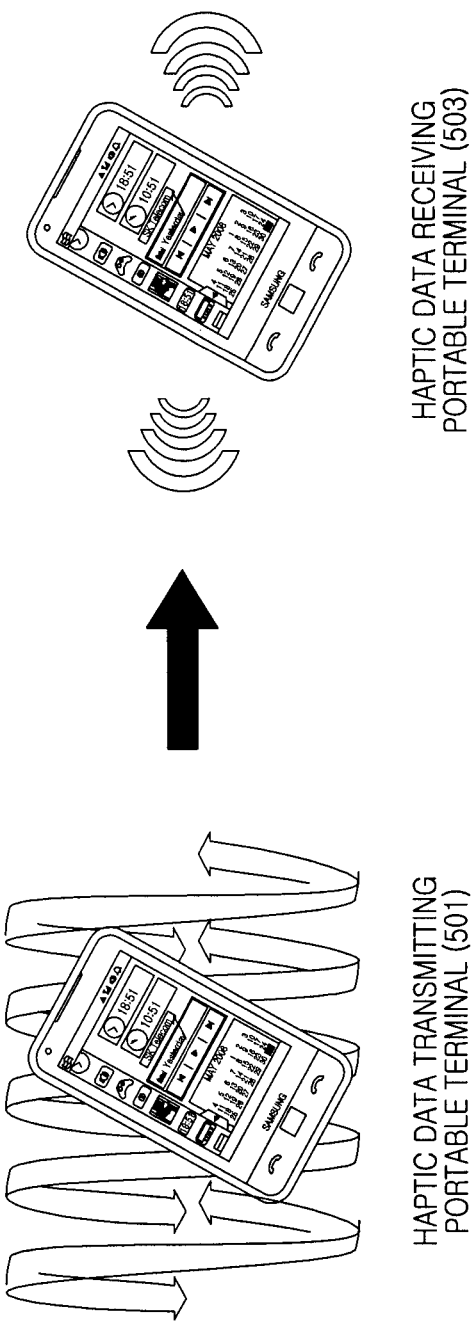

APPARATUS AND METHOD FOR PROVIDING HAPTIC FUNCTION IN A PORTABLE TERMINAL

CLAIM OF PRIORITY

This application claims priority to an earlier Korean patent application filed in the Korean Intellectual Property Office on Dec. 30, 2008 and assigned Serial No. 10-2008-00136308, the entire disclosure of which is hereby incorporated by reference in its entirety.

BACKGROUND OF THE INVENTION

1. Field of the Invention

The present invention relates to an apparatus and a method for providing a haptic function in a portable terminal, more particularly an apparatus and a method for providing the haptic function in the portable terminal according to a user's activity.

2. Description of the Related Art

Generally, a word "haptic" denotes a computer tactile sense technology and is originated from an adjective "haptesthai" from Greece.

In a conventional computer technology where user exchanges information using visual information and auditory information, a haptic technology is developed in order to satisfy users' desire since the users want to have more specific and more realistic information.

The haptic technology includes a force feedback and a tactile sense feedback. Users may feel a force and a motion through the force feedback and the users may feel a tactile sense to a corresponding object through the tactile sense feedback.

The haptic technology is applied to a game simulator and a medical simulator and so on. Also, the haptic technology is broadly applied to some fields which require an excessive cost, time and danger for humans.

Meanwhile, recently, many portable terminals, which coincide with various interest and requirement of users, are produced and supplied according to an advancement of an information technology including an internet and a computer. Various functions using the haptic technology are applied to the portable terminals.

Examples of portable terminals may include a cellular phone, a Personal Digital Assistant (PDA), a Portable Multimedia Player (PMP), a digital camera, a portable game machine and a Mpeg Layer 3 (MP3) player.

Some portable terminals are deployed with various vibration patterns using the haptic technology and provide a function for producing a vibration bell using the various vibration patterns.

However, the vibration patterns provided from the portable terminal with vibration bells are not adequate enough to satisfy user's various interests.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing an improved haptic function in a portable terminal.

Another aspect of the present invention is to provide an apparatus and a method for various user interfaces combining a gyroscope and the haptic function in the portable terminal.

Yet another aspect of the present invention is to provide an apparatus and a method for transforming a movement of the portable terminal to the haptic data by recognizing the movement of the portable terminal according to the user's activity in the portable terminal.

Still another aspect of the present invention is to provide an apparatus and a method for sharing a haptic data generated from a user by transferring the haptic data to another portable terminal in the portable terminal.

In accordance with an aspect of the present invention, a method for providing a haptic function in a portable terminal is provided, The method for providing the haptic function in the portable terminal includes determining information which denotes a movement of the portable terminal, generating a haptic data to stimulate a user's tactile sense according to the information and generating a vibration corresponding to the haptic data.

In accordance with another aspect of the present invention, an apparatus for providing a haptic function in a portable terminal includes a movement determination unit for determining information which denotes a movement of the portable terminal, a haptic data generation unit for generating a haptic data to stimulate a user's tactile sense according to the information, and a vibration unit for generating a vibration corresponding to the haptic data.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, an apparatus and a method for recognizing a movement of a portable terminal according to a user's activity by combining a gyroscope and a haptic function and for transforming the movement of a portable terminal to haptic data in the portable terminal.

Figure 1:
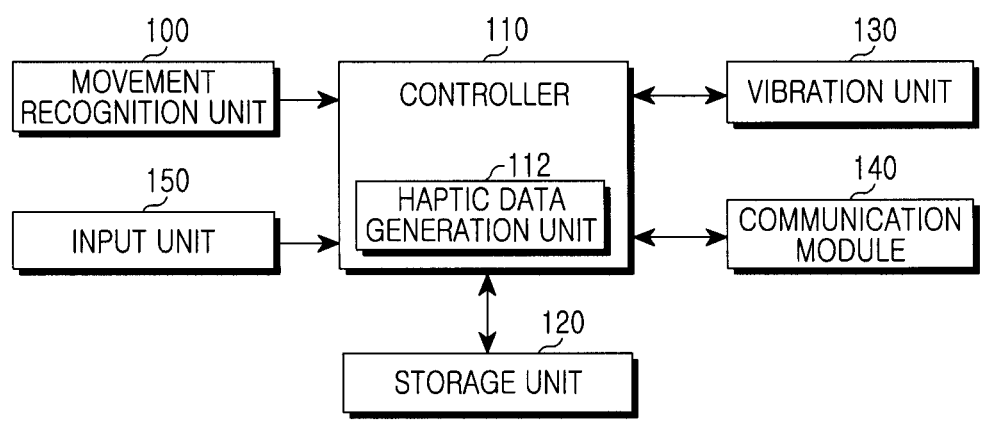
FIG. 1 illustrates a block diagram of a portable terminal according to an exemplary embodiment of the present invention.

FIG. 1 illustrates a block diagram of a portable terminal according to an exemplary embodiment of the present invention.

As illustrated in FIG. 1, the portable terminal comprises a movement recognition unit 100, a controller 110, a storage unit 120, a vibration unit 130, a communication module 140, and an input unit 150. The controller 110 further comprises a haptic data generation unit 112.

In operation, the movement recognition unit 100 determines a movement direction or an acceleration using a gyroscope according to a movement of the portable terminal.

Briefly, the gyroscope has a center axis and the gyroscope fixes a center of a gravity of metal disk with a heavy border width and the center of the gravity. The center axis may turn towards every direction of a space. The gyroscope may determine the movement direction or the acceleration of the portable terminal. For example, the gyroscope implicitly translates direction information with respect to an orientation associated with the mobile phone into an absolute frame of reference so that when the mobile phone is moved in a certain direction, the gyroscope obtains an offset from which a deviation can be calculated, etc. Note that gyroscope is known in this art, so a detailed description is omitted to avoid redundancy.

The movement recognition unit 100 detects the movement direction or the acceleration of the portable terminal under the control of the controller 110 and provides the detected movement direction or the acceleration to the controller 110. Herein, an example of the gyroscope is a gravity (G) sensor which determines a movement of an object by using gravity.

The controller 110 performs an overall control and process for a general operation of the portable terminal. Especially, the controller 110 controls and processes a function to transform a movement to a haptic data by recognizing the movement of the portable terminal according to the user's activity.

That is, when a haptic data generation event is occurred, the controller 110 controls the movement recognition unit 100 to determine the movement direction or the acceleration according to the movement of the portable terminal.

Then, the controller 110 recognizes a movement pattern corresponding to the movement direction or the acceleration through the haptic data generation unit 112, and the controller 110 in turn transforms the movement pattern to the haptic data format. Thus, the haptic data is generated.

Herein, the haptic data denotes data which generates a vibration for stimulating user's tactile sense and denotes a vibration scheme such as a vibration frequency and a vibration duration.

The controller 110 stores the haptic data to the storage unit 120 according to user's input. The controller 110 may set the haptic data as a notifying sound which notifies an incoming call.

Also, the controller 110 controls and processes a function to transmit the haptic data during a call with a peer portable terminal or during a text message mode. Further, the controller 110 analyzes a haptic data transmitted from a corresponding portable terminal. Lastly, the controller 110 controls and processes a function to generate a vibration through the vibration unit 130.

The storage unit 120 stores programs, for a general operation of the portable terminal, and data and especially stores programs, for generating the haptic data by recognizing the movement pattern through the movement direction or the acceleration, and data. The storage unit 120 stores the haptic data.

The vibration unit 130 represents the haptic data as a vibration according to a control of the controller 110.

The communication module 140 processes wireless signals corresponding to data transmitted/received through an antenna according to a control of the controller 140.

The input unit 150 includes number keys, character keys and several function keys, and the input unit 150 provides key input data corresponding to a key, which a user press/activation, to the controller 110.

Figure 2:
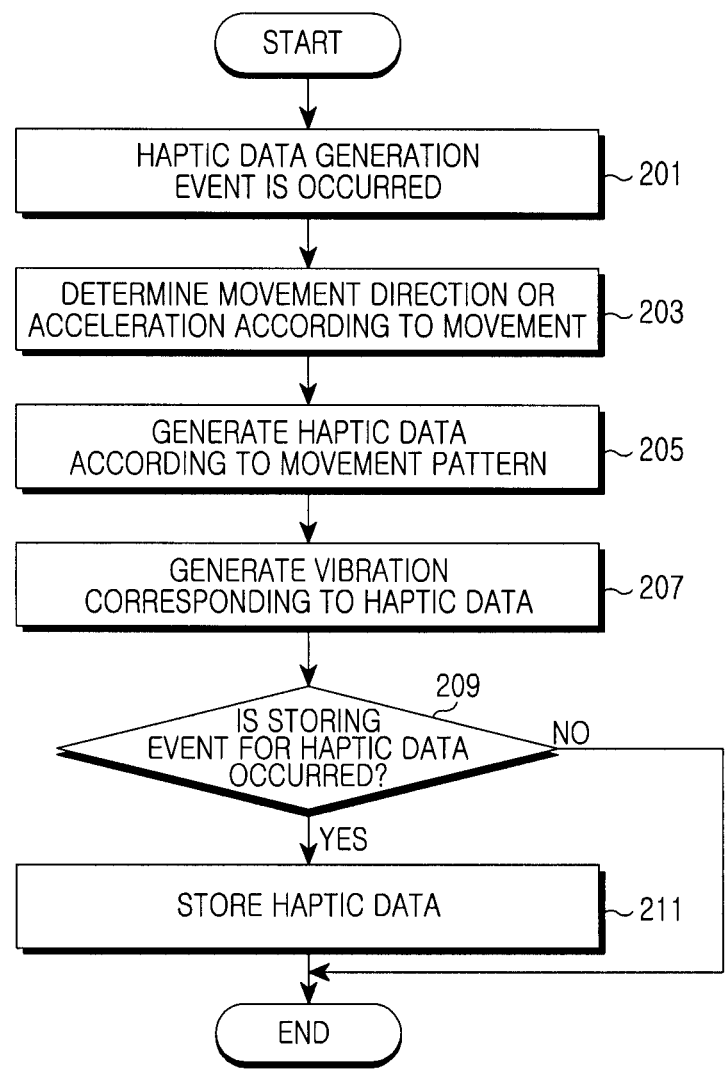
FIG. 2 illustrates a haptic data generation procedure according to user's activity in a portable terminal according to an exemplary embodiment of the present invention.

FIG. 2 illustrates a haptic data generation procedure according to user's activity in a portable terminal according to an exemplary embodiment of the present invention.

Referring to FIG. 2, when a haptic data generation event is occurred in step 201, the portable terminal determines a movement direction or an acceleration of the portable terminal according to a user's activity in step 203.

Herein, the portable terminal may determine the movement direction or the acceleration of the portable terminal through a gyroscope.

Hereafter, the portable terminal analyzes a movement pattern of the portable terminal using the movement direction or the acceleration of the portable terminal, and the portable terminal generates a haptic data according to the movement pattern in step 205.

Figure 4:
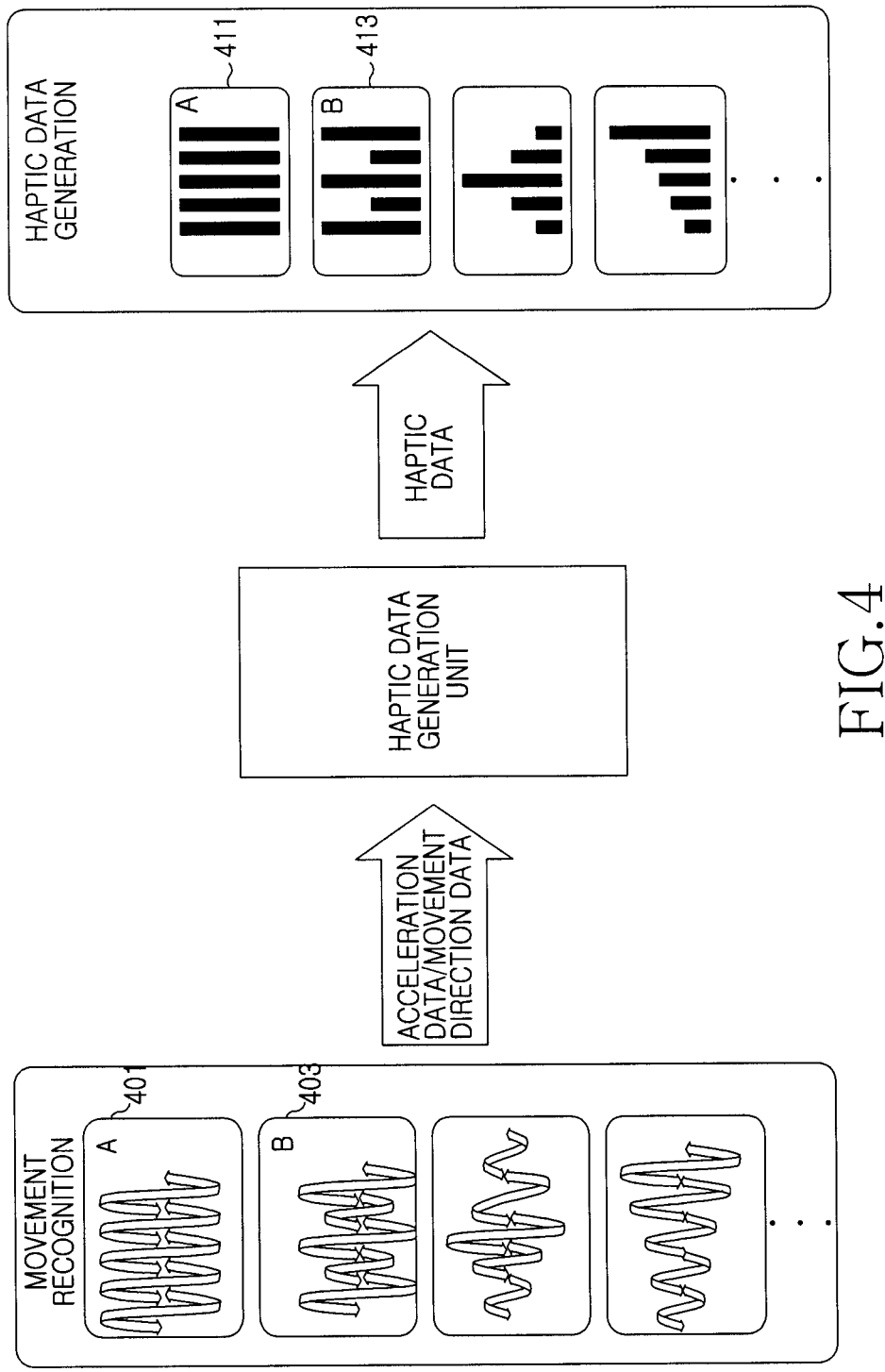
FIG. 4 illustrates a haptic data generation example according to user's activity in the portable terminal according to an exemplary embodiment of the present invention; and, FIG. 5 illustrates sharing a haptic data example with another portable terminal in the portable terminal according to an exemplary embodiment of the present invention.

For example, the portable terminal analyzes the movement pattern of the portable terminal through the movement direction or the acceleration of the portable terminal, and the portable terminal generates the haptic data according to the movement pattern in FIG. 4.

In FIG. 4, in a case like A 401, a result from the analysis of the movement direction or the acceleration of the portable terminal may denotes the portable terminal moves a steady distance in up and down direction repeatedly. In this case, the portable terminal may generates a vibration frequency repeatedly corresponding to the steady distance in 411.

Also, in a case like B 403, a result from the analysis of the movement direction or the acceleration of the portable terminal may denotes the portable terminal moves a short motion and a long motion in up and down direction repeatedly. In this case, the portable terminal may generates a vibration frequency repeatedly corresponding to the short distance and the long distance in 413

Herein, the portable terminal may control high and low of the vibration frequency according to the movement direction or the acceleration of the portable terminal and may control the duration for generating the vibration.

For example, a haptic data with a high frequency is generated as the portable terminal moves fast, and a haptic data with a low frequency is generated as a movement distance of the portable terminal is longer.

Also, a haptic data with a high frequency is generated as the portable terminal moves in an up or down direction, and a haptic data with a low frequency is generated as the portable terminal moves in a left or right direction and vice versa.

That is, the haptic data according to the movement pattern of the portable terminal may vary according to an implementation scheme and a configuration scheme. Hence, the portable terminal generates a vibration corresponding to the haptic data in step 207.

Hereafter, the portable terminal determines whether a storing event for the haptic data is occurred in step 209. When the storing event is occurred, the portable terminal stores the haptic data in step 211 and finishes an algorithm according to the present invention. Herein, the portable terminal may set the haptic data as a notifying sound which notifies an incoming call.

On the other hand, when the storing event is not occurred, the portable terminal finishes the algorithm according to the present invention.

Figure 3:
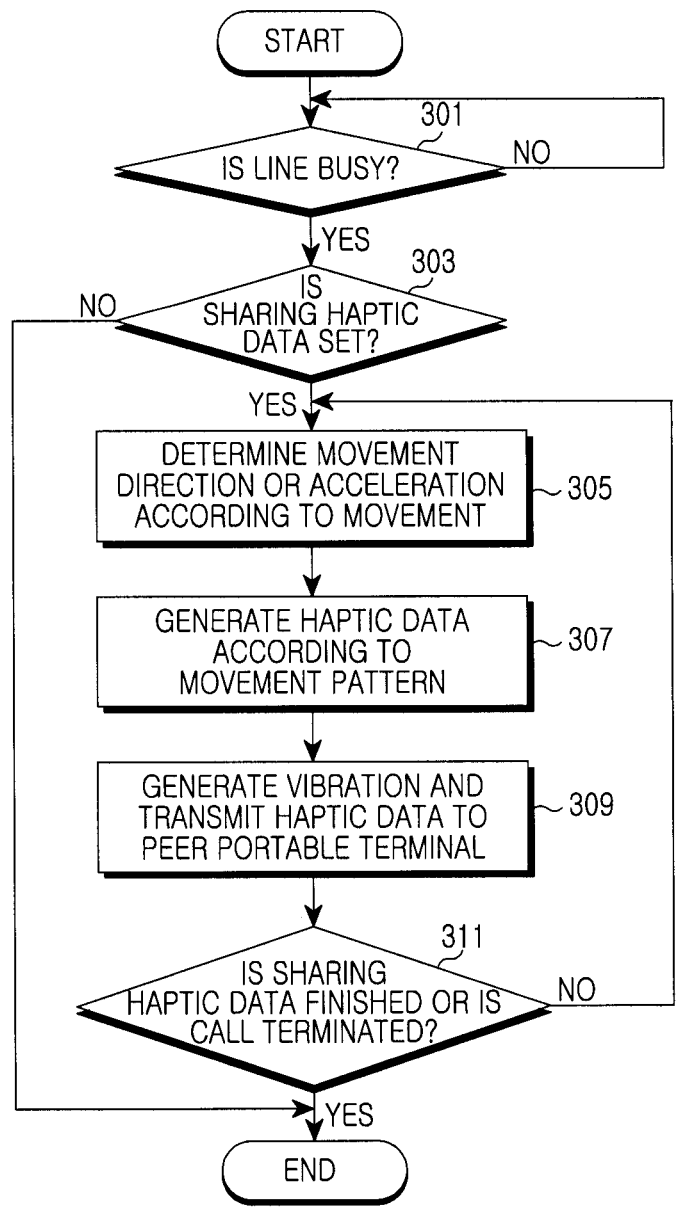
FIG. 3 illustrates sharing a haptic data procedure with peer portable terminal in the portable terminal according to an exemplary embodiment of the present invention.

FIG. 3 illustrates sharing a haptic data procedure with peer portable terminal in the portable terminal according to an exemplary embodiment of the present invention.

Referring to FIG. 3, the portable terminal determines whether the portable terminal is in communication with the peer portable terminal in step 301. That is, it is determined whether a line is busy.

When the portable terminal is in communication with the peer portable terminal, the portable terminal determines whether a function to share a haptic data is set or whether a function to share the haptic data during a call is set in advance in step 303.

When the function to share the haptic data is set or when the function to share the haptic data during the call is set in advance, the portable terminal determines a movement direction or an acceleration according to a movement of the portable terminal in step 305.

Hereafter, the portable terminal analyzes a movement pattern of the portable terminal according to the movement direction or the acceleration and generates the haptic data according to the movement pattern in step 307.

Hereafter, the portable terminal generates a vibration corresponding to the haptic data and transmits the haptic data to the peer portable terminal in step 309.

Herein, as illustrated in FIG. 5, the peer portable terminal 503 which receives the haptic data analyzes the haptic data received from the portable terminal 501 and generates a vibration corresponding to the haptic data. Thus, a user of the peer portable terminal 503 may feel an identical vibration with a user of the portable terminal 501 which transmits the haptic data.

Hereafter, the portable terminal determines whether the function to share the haptic data is completed or whether the call is terminated in step 311.

When the function to share the haptic data is finished or when the call is terminated, the portable terminal 501 finishes an algorithm according to the present invention.

When the function to share the haptic data is not finished or when the call is not terminated, the portable terminal 501 returns to the step 305 and performs the following steps.

In FIG. 3, the technology, that when the portable terminal is in communication with the peer portable terminal the haptic data which is generated according to the movement of the portable terminal is transmitted to the peer portable terminal and how the haptic data may be shared by transmitting the haptic data to the peer portable terminal, is explained.

However, a pre-generated hapic data may be transmitted to the peer portable terminal in communication with the portable terminal. Also, when the portable terminal is not in communication with the peer portable terminal, the haptic data may be attached to a message and the message may be transmitted, by the portable terminal, to another portable terminal.

The present invention may generate not a uniform haptic data but a user specific haptic data by combining the gyroscope and the haptic function, and by recognizing the movement of the portable terminal according to the user's activity in the portable terminal, and by transforming the movement of the portable terminal to the user haptic data.

The present invention may share the user haptic data generated according to the user's activity with a user of the peer portable terminal by transmitting the user haptic data to the peer portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a haptic function in a portable terminal, the method comprising:
   determining pattern information corresponding to a movement pattern of the portable terminal;
   generating a haptic data to stimulate a user's tactile sense corresponding to the determined pattern information; and,
   generating a vibration using the haptic data and having a vibration pattern corresponding to the movement pattern.

2. The method of claim 1, wherein the pattern information is determined through a gyroscope.

3. The method of claim 1, wherein the pattern information includes at least one of a direction of the portable terminal and an acceleration of the portable terminal.

4. The method of claim 3, wherein the haptic data has a vibration frequency and a vibration duration according to the pattern information including the direction of the portable terminal and the acceleration of the portable terminal.

5. The method of claim 1, further comprising:
   sharing the haptic data by transmitting the haptic data to another portable terminal.

6. The method of claim 5, wherein the haptic data is transmitted during a call connection to another portable terminal.

7. The method of claim 5, wherein the haptic data is transmitted during a text message mode.

8. The method of claim 1, wherein the haptic data is used to generate a notifying sound which notifies of an incoming call.

9. The method of claim 1, further comprising:
   attaching the haptic data to a message; and
   transmitting the message to another portable terminal.

10. An apparatus for providing a haptic function in a portable terminal, the apparatus comprising:

a movement determination unit for determining pattern information corresponding to a movement pattern of the portable terminal;

a haptic data generation unit for generating haptic data to stimulate a user's tactile sense, with the generated haptic data corresponding to the pattern information; and, a vibration unit for generating a vibration using the haptic data and having a vibration pattern corresponding to the movement pattern.

11. The apparatus of claim 10, wherein the pattern information is determined through a gyroscope.

12. The apparatus of claim 10, wherein the pattern information includes at least one of a direction of the portable terminal and an acceleration of the portable terminal.

13. The apparatus of claim 12, wherein the haptic data has a vibration frequency and a vibration time duration according to the pattern information including the direction of the portable terminal and the acceleration of the portable terminal.

14. The apparatus of claim 10, further comprising:

a communication module for transmitting the haptic data to another portable terminal.

15. The apparatus of claim 14, wherein the haptic data is used to generate a notifying sound which notifies of an incoming call.

16. The apparatus of claim 14, wherein the haptic data is transmitted during a call connection to another portable terminal.

17. The method of claim 14, wherein the haptic data is transmitted during a text message mode.

18. The apparatus of claim 10, further comprising:

a communication module for attaching the haptic data to a message for a subsequent transmission to another portable terminal.

* * * * *